US011797940B2

(12) United States Patent
Khanduja et al.

(10) Patent No.: US 11,797,940 B2
(45) Date of Patent: Oct. 24, 2023

(54) METHOD AND SYSTEM FOR ASSESSMENT AND NEGOTIATION OF COMPENSATION

(71) Applicant: JIO PLATFORMS LIMITED, Ahmedabad (IN)

(72) Inventors: Harjeet Khanduja, Navi Mumbai (IN); Hitesh Khatri, Navi Mumbai (IN); Umang Mathur, Thane (IN); Parul Garg, Navi Mumbai (IN); Rahul Mukherjee, Navi Mumbai (IN); Kaushik Chaniyara, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 180 days.

(21) Appl. No.: 17/035,353

(22) Filed: Sep. 28, 2020

(65) Prior Publication Data
US 2021/0097495 A1 Apr. 1, 2021

(30) Foreign Application Priority Data
Sep. 27, 2019 (IN) .............................. 201921039273

(51) Int. Cl.
*G06Q 10/1053* (2023.01)
*G06Q 50/18* (2012.01)
*G06Q 40/12* (2023.01)

(52) U.S. Cl.
CPC ....... *G06Q 10/1053* (2013.01); *G06Q 40/125* (2013.12); *G06Q 50/188* (2013.01)

(58) Field of Classification Search
CPC . G06Q 10/1053; G06Q 50/188; G06Q 40/125
See application file for complete search history.

(56) References Cited

U.S. PATENT DOCUMENTS

2010/0169245 A1* 7/2010 Basel ..................... G06N 20/00
706/12
2015/0193737 A1* 7/2015 Jadia .................. G06Q 10/1053
705/80

(Continued)

OTHER PUBLICATIONS

Mell, Johnathan, Markus Beissinger, and Jonathan Gratch. "An expert-model & machine learning hybrid approach to predicting human-agent negotiation outcomes." Proceedings of the 19th ACM International Conference on Intelligent Virtual Agents. 2019. (Year: 2019).*

(Continued)

*Primary Examiner* — Brendan S O'Shea
(74) *Attorney, Agent, or Firm* — Klarquist Sparkman, LLP (57) ABSTRACT

The technology relates to a system and a method for assessing and negotiating compensation of a human resource (candidate). Upon selection of a candidate(s), the method comprises of receiving compensation information of the candidate(s). The compensation assessment and negotiation system generates a salary proposal based on at least one of the compensation data, an assessment score of the candidate, a location, a minimum wage, a threshold salary and a recruitment policy. The compensation assessment and negotiation system also allows the candidate to negotiate the salary proposal by submitting a second salary proposal to the system. The compensation assessment and negotiation system thereafter generates a revised salary proposal in response to the second salary proposal. The compensation assessment and negotiation system rolls an offer to the candidate upon receiving a positive response on the salary proposal.

12 Claims, 6 Drawing Sheets

(56) References Cited

U.S. PATENT DOCUMENTS

| | | | | |
|---|---|---|---|---|
| 2015/0317709 | A1* | 11/2015 | Zimmerman | G06Q 30/0611 |
| | | | | 705/80 |
| 2019/0114593 | A1* | 4/2019 | Champaneria | G06F 16/3326 |
| 2019/0251573 | A1* | 8/2019 | Toyota | H04L 9/3236 |
| 2020/0118057 | A1* | 4/2020 | Fallis | G06Q 10/063112 |

OTHER PUBLICATIONS

Aydoğan, Reyhan, et al. "A machine learning approach for mechanism selection in complex negotiations." Journal of Systems Science and Systems Engineering 27 (2018): 134-155. (Year: 2018).*

* cited by examiner

METHOD AND SYSTEM FOR ASSESSMENT AND NEGOTIATION OF COMPENSATION

CROSS REFERENCE TO RELATED APPLICATIONS

This application claims priority to Indian Patent Application No. 201921039273, filed Sep. 27, 2019, the disclosure of which is hereby incorporated herein by reference in its entirety.

FIELD

The embodiments of the present invention generally relate to automated human resource management and more particularly relates to a method for automated compensation assessment and negotiation.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today, the world economy is characterized by huge potential and demand for skilled workers in the knowledge economy for a variety of jobs. As the criterion of education and experience has increased among the skilled workers, the opportunity for new sectors has opened for everyone. Also, with new skills development programs for new emerging technologies, a new pool of people having necessary and desired skills are being created. There are currently many jobs in the global market for talented resources while there is a challenge in recruiting the right talents with the right skills and compensation. This is complicated in many industries as employees tend to move from one job to another job every few years. The situation is particularly for skilled employees and even more particularly true in the information technologies industries. An advantage in identifying, obtaining and managing employees represents a significant strategic advantage for an HR department in an organization.

Traditionally, the assessment for hiring has been done by individuals within a human resource department of an Employer Organization who describe various attributes related to a position. For example, the human resource procurement person (recruiter) may detail the requirements for an open job, advertise for individuals, or source candidates through third parties, collect resumes of candidates, evaluate the resumes to determine the qualifications of a candidate versus the job requirements, select the best-matching candidates, interview the best-matching candidates, and select a final candidate for a job offer. It is increasingly difficult for employers to identify and hire qualified employees and contractors for particular positions. There are multiple stages involved in the recruitment process which includes screening, matching and selection process, wherein screening is the evaluation of candidates to see if they meet a basic set of requirements for a position and matching refers to the qualitative and quantitative matching of a candidates' qualifications and compensation with the overall requirements of a position.

Human resource needs often arise suddenly and unpredictably but must be filled quickly with product development cycles and product life cycles becoming shorter, personnel with needed skills must be identified and hired quickly. At the same time, each candidate's position and salary and records must be sufficiently analyzed to make meaningful decisions. Currently, Human Resources departments in large scale and distributed organizations use tools which provide specialized services such as computation and comparison of employment offers and job descriptions using unique data that describes individual participants. Selecting employment from among a pool of available positions is a difficult decision involving many factors such as cost of relocation, salary, cost of living, commuting distance, and the like. Many of these factors are unique to a particular applicant. The assessment technology because of the substantial benefits helps the HR department to select individuals having particular characteristics that correspond to a particular profile, there has been extensive commercial interest in developing human resource assessment technology.

Despite attempts to update existing human resource assessment technology a long-felt but unresolved need remains for standardized methods and devices to screen, evaluate, or match individuals with defined profile parameters. As such, substantial problems with present human resource assessment technology remains unresolved. The conventional technology for human resource (candidate) assessment prevalent maybe that text file information or text file resume automation utilizing varied parameters for comparison.

The steps of the current negotiation cycle performed during the recruitment process are described as follows. Firstly, the recruiter gets the negotiation documents from the candidate and prepares a draft salary proposal as per job hiring guidelines, which is then shared with the candidate. Secondly, the candidate reviews the salary proposal draft, which ultimately leads to either acceptance or rejection of the proposal. However, in case of proposal rejection by the candidate a feedback is shared with the employer for reconsideration in the proposal. Thirdly, the feedback received is shared with the recruiter, which upon iteration is shared again with the candidate in the form of revised salary proposal. Fourthly, the candidate reviews the revised salary proposal sent by the recruiter and further approves/rejects the same. Fifthly, based on the candidate's selection of accepting/rejecting the salary proposal the recruiter finally submits the final offer to the candidate.

Such an approach produces data that is incomplete, inaccurate and non-standardized, the automation of screening and matching of candidates to positions is greatly compromised. Using test file information or text file resume-based databases, automated screening processes produces poor results because of the poor quality of data. Generally, the screening thresholds have to be set low or run the risk of rejecting qualified candidates, thus greatly increasing the number of resumes that have to be reviewed by recruiter, thus increasing the time and cost needed to arrive at a pool of qualified potential candidates.

An existing solution describes providing an automated human resource assessment system having computer-based processes, wherein programmable hardware or software system having standardized profile parameters that may be combined with database management or statistical techniques to screen, evaluate, or match individuals with defined profile parameters. Another existing solution provides a system and method for matching human resources (candidates) to human resource needs of an organization. Yet another existing solution describes providing a system and method to an individual to initiate the gathering, processing, authentication and distribution, for free or resale, of his or her personal information from a plurality of sources including, but not limited to, criminal, civil, credit and medical entities. Another existing solution uses job salary range to manage human resources budget, so that candidates are offered between the salary ranges. Yet another existing solution describes creating, editing and updating, verifying, and referencing a database of work, educational, and licensing histories of workers include an internet service which provides a secure means for prospective employees to enter and record on a database a personal educational and job history covering any time period. However, all the above disclosures do not disclose any solution for analysis of matching component-wise compensation details of the prospective candidates along with text resumes. The above does use real-time median salary for the job and real-time salary benchmarks to propose compensation for a candidate. Also, the above do not disclose solution for assessment of the fixed compensation, variable compensation, benefits, additional payments, grade by enabling the recruiter to do section-wise negotiation with the potential candidate.

Despite numerous attempts to update existing human resource assessment technology, a long-felt need is there, for an efficient and improved way of assessment and negotiation of the salary component but the current assessment system has failed to resolve the growing needs. A significant problem with conventional assessment system is that it cannot match component-wise compensation details of the prospective candidates along with text resumes, as a source of data regarding the candidate's compensation for a specific position by extracting and analyzing the metadata from the submitted salary slip by the candidate. The principal weakness of the conventional approach to human resource (candidate) compensation and negotiation assessment processes is the nature of the original data source, text information, and matching based on the previous compensation details gathered from the previous employer. Hence, there is a need for a system and method for efficiently providing an automated human resource (candidate) assessment and negotiation solution.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for assessing and negotiating compensation of candidate. Another object of the present disclosure is to provide a system and method for effective salary negotiation during the recruitment process by saving cost for various large scale and distributed organizations who lose millions every year due to structural inefficiencies of salary negotiation. Yet another object of the present disclosure is to provide a system and method for an automated assessment and negotiation system to bring standardization in the recruitment process leading to uniformity, fairness and speed. Yet another object of the present disclosure is to provide a system and method to ensure adherence to the minimum wage regulation across the large scale & distributed organization. Yet another object of the present disclosure is to provide a system and method to provide a comprehensive method of negotiation in a manner which is best for both the Employer and employee. Yet another object of the present disclosure is to provide a system and method to provide for comprehensive solution with closed-loop feedbacks mechanism, wherein the successful and unsuccessful proposals can be analyzed by machine learning and make competitive future offers to the prospective candidates. Yet another object of the present disclosure is to provide a system and method to provide a comprehensive summary of internal compensation benchmarking for individual skill and experience. Yet another object of the present invention is to provide a system and a method for historical analysis of the compensation data entered by the candidates which are stored and compared to provide a historical and industry-wise analysis of the compensation being offered in the market for different job roles, skill types, experience & education backgrounds. Yet another object of the present invention is to provide a system and a method for scanning and recognizing forged salary documents based on the previous salary documents submitted by the candidate. Yet another object of the present invention is to provide a system and a method for break-up of salary components giving a realistic view to the candidate and recruiter about changes in compensation resulting in maintaining internal/external parity during salary negotiation.

In order to achieve the aforementioned objectives, the present invention provides a method and system for performing a closed loop transaction. The method comprises determining, by a candidate selection module, a selection of at least one candidate device, wherein the at least one candidate device is associated with a human resource (candidate). Next, a compensation data recording module receives a compensation data from the at least one candidate device. Subsequently, a salary proposal creation module creates a first salary proposal based on the compensation data received at the compensation data recording module. Further, the salary proposal creation module transmits the first salary proposal to the at least one candidate device. Next, an acceptance feedback module receives a response from the at least one candidate device for the first salary proposal. Subsequently, an offer release module generates a salary offer for the at least one candidate device based on the response received for the first salary proposal. Lastly, the offer release module transmits the salary offer to the at least one candidate device for assessing and negotiating compensation of the human resource (candidate) associated with the at least one candidate device.

Another aspect of the present invention relates to a compensation assessment and negotiation system. The system comprises of an offer release module, an acceptance feedback module, a salary proposal creation module, a compensation data recording module and a candidate selection module. The candidate selection module is configured to determine a selection of at least one candidate device, wherein the at least one candidate device is associated with a human resource (candidate). The compensation data recording module is configured to receive a compensation data from the at least one candidate device. The salary proposal creation module is configured to create a first salary proposal based on the compensation data, and to transmit the first salary proposal to the at least one candidate device. The acceptance feedback module is configured to receive a response from the at least one candidate device for the first salary proposal. The offer release module is configured to generate a salary offer for the at least one candidate device based on the response received for the first salary proposal, and to transmit the salary offer to the at least one candidate device for assessing and negotiating compensation of a human resource (candidate) associated with the at least one candidate device.

Yet another aspect of the present invention relates to a non-transitory computer-readable medium comprising instructions for causing a computer to perform the method of determining a selection of at least one candidate device, wherein the at least one candidate device is associated with a human resource (candidate); receiving a compensation data from the at least one candidate device; creating a first salary proposal based on the compensation data; transmitting the first salary proposal to the at least one candidate device; receiving a response from the at least one candidate device for the first salary proposal; generating a salary offer for the at least one candidate device based on the response received for the first salary proposal; and transmitting the salary offer to the at least one candidate device for assessing and negotiating compensation of the human resource (candidate) associated with the at least one candidate device.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "candidate device [102]", "smart computing device" refers to any electrical, electronic, electro-mechanical or an equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, etc.

As used herein, "database" "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein 'computer readable media' refers to both volatile and non-volatile media, removable and non-removable media, any available medium that may be accessed by the computing device. By way of example and not limitation, computer readable media comprise computer storage media and communication media.

Hereinafter, exemplary embodiments of the present disclosure will be described in detail with reference to the accompanying drawings so that those skilled in the art can easily carry out the present disclosure.

The present technologies provide solutions to the above mentioned problem of the current system by providing a system and a method for efficiently recommending salary proposals that can be offered to the candidate based on varied parameters including but not limited to component-wise verified compensation details, location, median of the salary range along with data of statutory minimum wages of the respective location. Particularly, the system provides a solution where the candidate can be assessed based on component wise verified compensation details, total compensation approach (which includes compensation, valuation of benefits, location and many other factors), median of the salary range, and statutory minimum wages of the respective location for assessment of the fixed compensation, variable compensation, benefits, additional payments, grade by enabling the recruiter to do section wise negotiation with the potential candidate.

Figure 1:
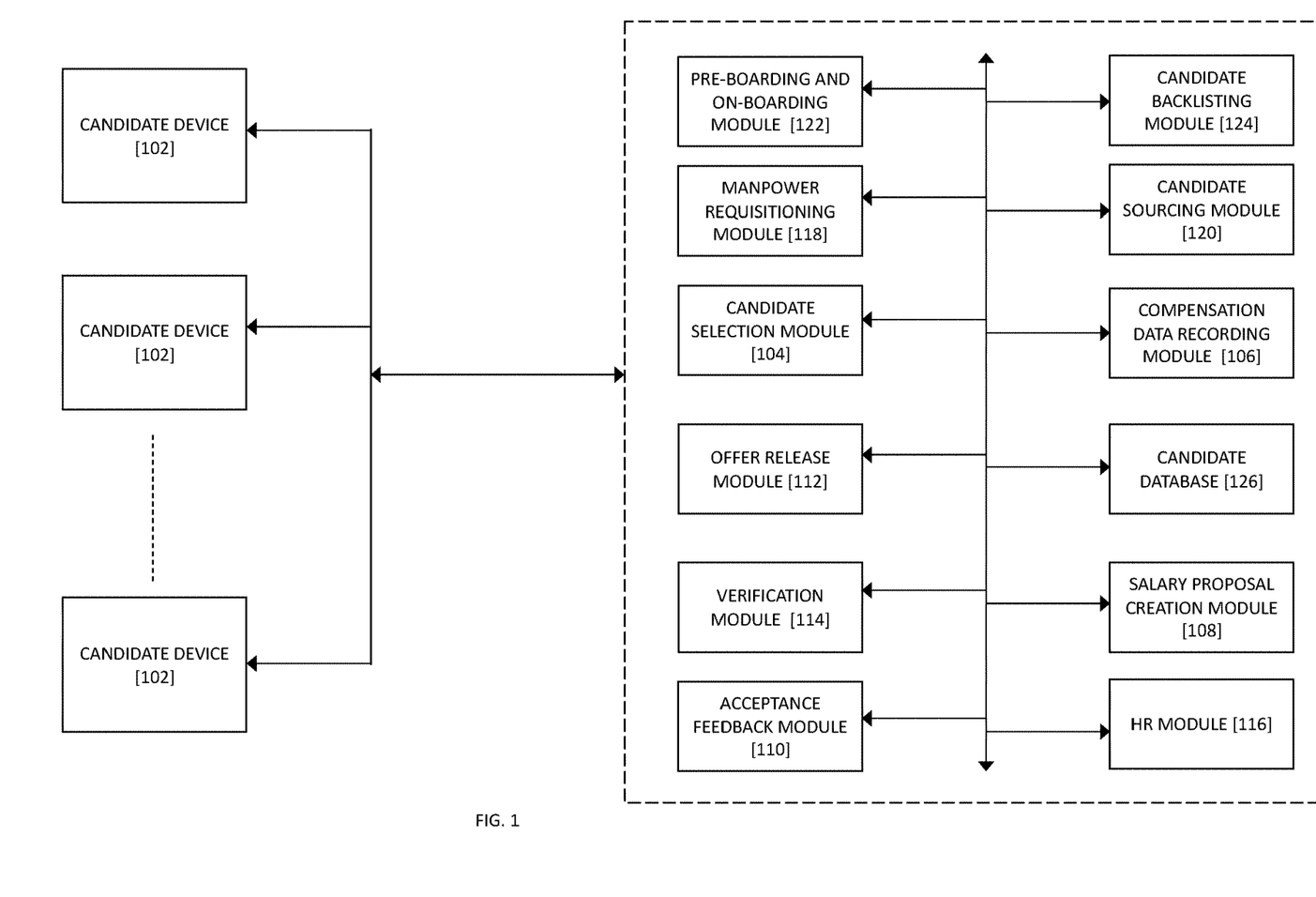
Referring to FIG. 1 illustrates an exemplary block diagram of a compensation assessment and negotiation system, in accordance with exemplary embodiments of the present invention.

Referring to FIG. 1 illustrates an exemplary block diagram of a compensation assessment and negotiation system, in accordance with exemplary embodiments of the present invention. The system comprises of an offer release module [112], an acceptance feedback module [110], a salary proposal creation module [108], a compensation data recording module [106], a candidate selection module [104], a manpower requisitioning module [118], a verification module [114], an HR module [116], a candidate database [126], a candidate sourcing module [120], a pre-boarding and on-boarding module [122] and a candidate backlisting module [124], all the components are connected to each other unless otherwise indicated and work in conjunction to achieve the objectives of the present invention.

The manpower requisitioning module is connected to the offer release module [112], the acceptance feedback module [110], the salary proposal creation module [108], the compensation data recording module [106], the candidate selection module [104], the verification module [114], the HR module [116], the candidate database [126], the candidate sourcing module [120], the pre-boarding and onboarding module [122] and the candidate backlisting module [124]. The manpower requisitioning module is configured to collect a first data relating to the recruitment procedure, including but not limited to job descriptions, pay-bands, skills required along with the details of organization structure which includes vacancies, positions, and employee requirement and determines the number of candidates required to be hired.

The candidate sourcing module [120] is connected to the offer release module [112], the acceptance feedback module [110], the salary proposal creation module [108], the compensation data recording module [106], the candidate selection module [104], the manpower requisitioning module

[118], the verification module [114], the HR module [116], the candidate database [126], the pre-boarding and onboarding module [122] and the candidate backlisting module [124]. The candidate sourcing module [120] is configured to receive the first data from the manpower requisitioning module. The candidate sourcing module [120] is further configured to collect a second data regarding potential candidates from various sources including but not limited to social media platforms, career consultants, career websites, job boards, and internal candidate pool based on the first data. For example, the candidate sourcing module [120] collects relevant candidate information based on at least one of job descriptions, pay-bands, skills required along with the details of organization structure.

The candidate selection module [104] is connected to the offer release module [112], the acceptance feedback module [110], the salary proposal creation module [108], the compensation data recording module [106], the manpower requisitioning module [118], the verification module [114], the HR module [116], the candidate database [126], the candidate sourcing module [120], the pre-boarding and on-boarding module [122] and the candidate backlisting module [124]. The candidate selection module [104] is configured to determine a selection of at least one candidate device [102], wherein each of the at least one candidate device [102] is associated with a human resource (candidate). The candidate selection module [104] is further configured to determine the selection of the at least one candidate device [102] based on at least one of an assessment score, a video interview score and a personal interview score. In this regard, the present invention encompasses that the candidate selection module [104] is further configured to screen the candidates through online assessments, video interviews or personal interviews thereby, helping in the selection of the candidate.

In another instance, the present invention further encompasses that the candidate selection module [104] is further configured to compare at least one of the assessment score, the video interview score and the personal interview score of the two or more candidate devices [102] in event the two or more candidate devices [102] have at least one of the assessment score, the video interview score and the personal interview score same. Based on the comparison, the candidate selection module [104] transmits a rating for the two or more candidate devices [102] to an HR module [116]. The candidate selection module [104] is further configured to receive the selection of the at least one candidate device [102] from the two or more candidate devices [102] from the HR module [116].

The compensation recording data module is connected to the offer release module [112], the acceptance feedback module [110], the salary proposal creation module [108], the candidate selection module [104], the manpower requisitioning module [118], the verification module [114], the HR module [116], the candidate database [126], the candidate sourcing module [120], the pre-boarding and on-boarding module [122] and the candidate backlisting module [124]. The compensation data recording module [106] is configured to receive a compensation data from the at least one candidate device [102]. The compensation data recording module [106] is further configured to request the at least one candidate device [102] for the first data. Thus, in operation, the compensation data recording module [106] is configured to collect and record the previous category wise compensation details of the candidates. The present invention encompasses that the compensation data comprises of at least one of a fixed compensation, a variable compensation, a benefit and an additional payment.

The verification module [114] is connected to the offer release module [112], the acceptance feedback module [110], the salary proposal creation module [108], the compensation data recording module [106], the candidate selection module [104], the manpower requisitioning module [118], the HR module [116], the candidate database [126], the candidate sourcing module [120], the pre-boarding and on-boarding module [122] and the candidate backlisting module [124]. The verification module [114] is configured to verifies the compensation data received from the compensation data recording module [106], for example, the documents collected from the prospective candidates.

The salary proposal creation document is connected to the offer release module [112], the acceptance feedback module [110], the compensation data recording module [106], the candidate selection module [104], the manpower requisitioning module [118], the verification module [114], the HR module [116], the candidate database [126], the candidate sourcing module [120], the pre-boarding and on-boarding module [122] and the candidate backlisting module [124]. The salary proposal creation module [108] is configured to create a first salary proposal based on the compensation data. In this regards, the present invention encompasses that the salary proposal creation module [108] is configured to receive at least one of the assessment score, the video interview score and the personal interview score for the at least candidate device [102] from the candidate selection module [104]. The salary proposal creation module [108] is further configured to receive at least one of a verified fixed compensation, a verified variable compensation, a verified benefit and a verified additional payment from a verification module [114] connected to the offer release module [112], the acceptance feedback module [110], the salary proposal creation module [108], the compensation data recording module [106] and the candidate selection module [104]. It further extracts at least one a minimum wage information, a threshold salary, a location and a recruitment policy. The salary proposal creation module [108] is further configured to create the first salary proposal for the at least one candidate device [102] based on at least one of the assessment score, the video interview score, the personal interview score, the verified fixed compensation, the verified variable compensation, the verified benefit, the verified additional payment, the minimum wage information, the threshold salary, the location and the recruitment policy. The salary proposal creation module [108] is further configured to transmit the first salary proposal to the at least one candidate device [102]

The acceptance feedback module [110] is connected to the offer release module [112], the salary proposal creation module [108], the compensation data recording module [106], the candidate selection module [104], the manpower requisitioning module [118], the verification module [114], the HR module [116], the candidate database [126], the candidate sourcing module [120], the pre-boarding and on-boarding module [122] and the candidate backlisting module [124]. The acceptance feedback module [110] is configured to receive a response from the at least one candidate device [102] for the first salary proposal. In operation, the acceptance feedback module [110] is triggered when the prospective candidate rejects/accepts the salary proposal.

The present invention encompasses that in an event a negative response is received from the at least one candidate device [102], the acceptance feedback module [110] requests a second salary proposal from the at least one candidate device [102] based on a negative response received for the first salary proposal. In response to receiving the second salary proposal from the at least one candidate device [102], the acceptance feedback module [110] creates a third salary proposal based on at least one of the second salary proposal, the assessment score, the video interview score, the personal interview score, the verified fixed compensation, the verified variable compensation, the verified benefit, the verified additional payment, the minimum wage information, the threshold salary, the location and the recruitment policy.

The present invention encompasses that the acceptance feedback module [110] is further configured to iteratively request a second salary proposal from the at least one candidate device [102] until at least one of a response from an HR module [116] and a positive response from the at least one candidate device [102] is received at the acceptance feedback module [110]. In yet another instance, the present invention encompasses that the acceptance feedback module [110] is further configured to continuously train a data model based on a response received for at least one of the first salary proposal, the second salary proposal and the third salary proposal, wherein the trained data model determines an acceptance rate of at least subsequent salary proposal received from the at least one candidate device [102]. Accordingly, the acceptance rate of the at least one subsequent salary proposal is displayed to the at least one candidate device [102] upon receiving the at least one subsequent salary proposal from the at least one candidate device [102].

The offer release module [112] is connected to the acceptance feedback module [110], the salary proposal creation module [108], the compensation data recording module [106], the candidate selection module [104], the manpower requisitioning module [118], the verification module [114], the HR module [116], the candidate database [126], the candidate sourcing module [120], the pre-boarding and on-boarding module [122] and the candidate backlisting module [124]. The offer release module [112] is configured to generate a salary offer for the at least one candidate device [102] based on the response received for the first salary proposal. The present invention encompasses that the offer release module [112] is further configured to generate the salary offer for the at least one candidate device [102] based on a positive response received for the first salary proposal. In an instance the present invention encompasses that the offer release module [112] request the at least one candidate device [102] to provide at least one of a fixed compensation input, a variable compensation input, a benefit input and an additional payment input from the at least one candidate device [102], wherein the salary offer is generated based on the received at least one of the fixed compensation input, the variable compensation input, the benefit input and the additional payment input. For example, the offer release module [112] approves and releases the formal documents along with the offer letter to the selected candidates.

The offer release module [112] is further configured to transmit a request for at least one of an identity data, an educational data and a medical data to the at least one candidate device [102]; and to receive at least one of the identity data, the educational data and the medical data from the at least one candidate device [102]. The offer release module [112] is further configured to transmit the received at least one of the identity data, the educational data and the medical data to the verification module [114], and thereafter the verified at least one of the identity data, the educational data and the medical data is saved in the candidate database [126] against the at least one candidate device [102]. The offer release module [112] is further configured to transmit the salary offer to the at least one candidate device [102] for assessing and negotiating compensation of a human resource (candidate) associated with the at least one candidate device [102].

The verification module [114] is connected to the offer release module [112], the acceptance feedback module [110], the salary proposal creation module [108], the compensation data recording module [106], the candidate selection module [104], the manpower requisitioning module [118], the HR module [116], the candidate database [126], the candidate sourcing module [120], the pre-boarding and on-boarding module [122] and the candidate backlisting module [124]. The verification module [114] is configured to verify at least one of the fixed compensation, the variable compensation, the benefit and the additional payment of the compensation data. The verification module [114] is further configured to verify at least one of the identity data, the educational data and the medical data received from the at least one candidate device [102]. Thus, in operation, the verification module [114] performs verification of the documents provided by the candidates and categorizes them based on individual selected candidate profile. The present invention encompasses that the system may comprise of final employee verification module [114] and a negotiation document verification module [114]. The Negotiation document verification module [114] verifies the compensation documents collected from the prospective candidates. The final employee verification module [114] performs the final verification of the documents and categorizes them based on individual selected candidate profile.

The pre-boarding and on-boarding module [122] is connected to the offer release module [112], the acceptance feedback module [110], the salary proposal creation module [108], the compensation data recording module [106], the candidate selection module [104], the manpower requisitioning module [118], the verification module [114], the HR module [116], the candidate database [126], the candidate sourcing module [120] and the candidate backlisting module [124]. The pre-boarding and on-boarding module [122] is configured to transmits the relevant details and documents w.r.t the pre-boarding and on-boarding process to the selected candidate on the at least one candidate device [102].

The candidate blacklisting module [124] is connected to the offer release module [112], the acceptance feedback module [110], the salary proposal creation module [108], the compensation data recording module [106], the candidate selection module [104], the manpower requisitioning module [118], the verification module [114], the HR module [116], the candidate database [126], the candidate sourcing module [120] and the pre-boarding and on-boarding module [122]. The candidate blacklisting module [124] is configured to perform cross-check of the candidates logs and historical data and blacklists candidates who are not coherent with the whole recruitment process.

The HR Module [116] is connected to the offer release module [112], the acceptance feedback module [110], the salary proposal creation module [108], the compensation data recording module [106], the candidate selection module [104], the manpower requisitioning module [118], the verification module [114], the candidate blacklisting module [124], the candidate database [126], the candidate sourcing module [120] and the pre-boarding and on-boarding module [122]. The HR module [116] is configured to receive inputs from the HR personnel (e.g., a recruiting manager). In an event a negative response is receive from the at least one candidate device [102] on the first salary proposal, the acceptance feedback module [110] iteratively requests a second salary proposal from the at least one candidate device [102] until at least one of a response from an HR module [116]. Thus, in operation, if upon receiving a refusal to the first salary proposal, in the event the HR module [116] receives input to cease the method, the acceptance feedback module [110] does not request the second salary proposal from the at least one candidate device [102].

Also, in the event there are two or more candidate devices [102], the candidate selection module [104] transmit the ratings for the two or more candidate devices [102] to an HR module [116] based on the comparison. In this regard, the HR module [116] is configured to provide a selection of the at least one candidate device [102] from the two or more candidate devices [102] at the candidate selection module [104] based upon input from the HR personnel.

Figure 2:
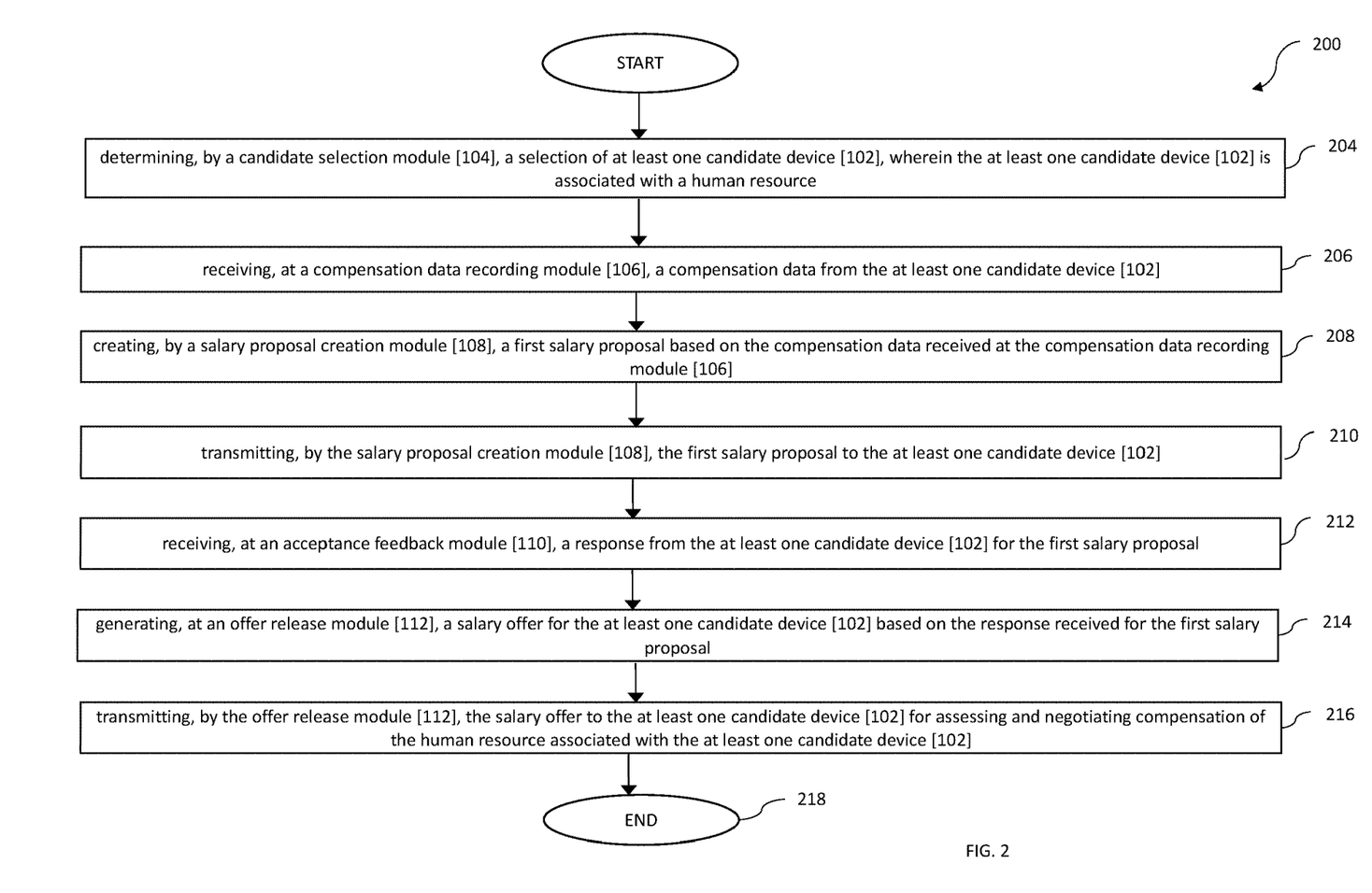
Referring to FIG. 2 illustrates an exemplary method flow diagram depicting a method for assessing and negotiating compensation of a human resource (candidate), in accordance with exemplary embodiments of the present invention.

Referring to FIG. 2 illustrates an exemplary method flow diagram depicting a method for assessing and negotiating compensation of a human resource (candidate), in accordance with exemplary embodiments of the present invention. The method begins at step [202]. The method at step [204] comprises determining, by a candidate selection module [104], a selection of at least one candidate device [102], wherein the at least one candidate device [102] is associated with a human resource (candidate). The present invention encompasses that the candidate selection module [104] determines the selection of the at least one candidate device [102] based on at least one of an assessment score, a video interview score and a personal interview score At step [206], the compensation data recording module [106] receives a compensation data from the at least one candidate device [102]. The present invention encompasses that receiving the compensation data from the at least one candidate device [102] further comprises requesting, by the compensation data recording module [106], the at least one candidate device [102] for the first data.

At step [208], the salary proposal creation module [108] creates a first salary proposal based on the compensation data received at the compensation data recording module [106]. The present invention encompasses that the first salary comprises of at least one of a fixed compensation, a variable compensation, a benefit and an additional payment. At step [210], the salary proposal creation module [108] transmits the first salary proposal to the at least one candidate device [102].

The present invention further encompasses that creating the first salary proposal by the salary proposal creation module [108] further comprises receiving, at the salary proposal creation module [108], at least one of the assessment score, the video interview score and the personal interview score for the at least candidate device [102] from the candidate selection module [104], and receiving, from a verification module [114], at least one of the verified fixed compensation, the verified variable compensation, the verified benefit and the verified additional payment. Next, the salary proposal creation module [108] extracts at least one a minimum wage information, a threshold salary, a location and a recruitment policy and creates the first salary proposal for the at least one candidate device [102] based on at least one of the assessment score, the video interview score, the personal interview score, the verified fixed compensation, the verified variable compensation, the verified benefit, the verified additional payment, the minimum wage information, the threshold salary, the location and the recruitment policy.

At step [212], the acceptance feedback module [110] receives a response from the at least one candidate device [102] for the first salary proposal. At step [214], the offer release module [112] generates a salary offer for the at least one candidate device [102] based on the response received for the first salary proposal. The present invention further encompasses that the generating the salary offer for the at least one candidate device [102] at the offer release module [112] further comprises receiving at least one of a fixed compensation input, a variable compensation input, a benefit input and an additional payment input from the at least one candidate device [102], wherein the salary offer is generated based on the received at least one of the fixed compensation input, the variable compensation input, the benefit input and the additional payment input, thus, allowing the candidate to design their compensation. At step [216], the offer release module [112] transmits the salary offer to the at least one candidate device [102] for assessing and negotiating compensation of the human resource (candidate) associated with the at least one candidate device [102]. The method completes at step [218].

The method of the present invention further comprises transmitting, by the offer release module [112], a request for at least one of an identity data, an educational data and a medical data to the at least one candidate device [102]. Next, the offer release module [112] receives at least one of the identity data, the educational data and the medical data from the at least one candidate device [102]. Subsequently, the verification module [114], verifies at least one of the identity data, the educational data and the medical data received from the at least one candidate device [102]. Lastly, the salary offer and the verified at least one of the identity data, the educational data and the medical data for the at least one candidate device [102] are stored at the candidate database [126].

The present invention also encompasses that determining, by a candidate selection module [104], a selection of at least one candidate device [102], wherein the at least one candidate device [102] is associated with a human resource (candidate) further comprises collecting, by the manpower requisitioning module, a first data relating to the recruitment procedure, including but not limited to job descriptions, pay-bands, skills required along with the details of organization structure which includes vacancies, positions, and employee requirement and determines the number of candidates required to be hired. Next, the candidate sourcing module [120] collects a second data regarding potential candidates from various sources including but not limited to social media platforms, career consultants, career websites, job boards, and internal candidate pool based on the first data.

The present invention also encompasses that the acceptance feedback module continuously trains a data model based on a response received for at least one of the first salary proposal, the second salary proposal and the third salary proposal, wherein the trained data model determines an acceptance rate of at least subsequent salary proposal received from the at least one candidate device [102]. In an instance, the acceptance rate of the at least one subsequent salary proposal is displayed to the at least one candidate device [102] upon receiving the at least one subsequent salary proposal from the at least one candidate device [102].

The present invention further encompasses that determining the selection of the at least one candidate device [102] in event there are two or more candidate devices [102] having at least one of the assessment score, the video interview score and the personal interview score as the same, by the candidate selection module [104], further comprises comparing, by the candidate selection module [104], at least one of the assessment score, the video interview score and the personal interview score of the two or more candidate devices [102]. Next, the candidate selection module [104] transmits a rating for the two or more candidate devices [102] to an HR module [116] based on the comparison. Subsequently, the selection of the at least one candidate device [102] from the two or more candidates devices [102] is received from the HR module [116] at the candidate selection module [104].

The present invention further encompasses that the offer release module [112] generates the salary offer for the at least one candidate device [102] based on a positive response received for the first salary proposal. The present invention further encompasses that the in an event a negative response is received from the at least one candidate device [102], the method further comprises requesting, by the acceptance feedback module [110], a second salary proposal from the at least one candidate device [102] based on a negative response received for the first salary proposal. Upon receiving, at the acceptance feedback module [110], the second salary proposal from the at least one candidate device [102], the acceptance feedback module [110] creates a third salary proposal based on at least one of the second salary proposal, the assessment score, the video interview score, the personal interview score, the verified fixed compensation, the verified variable compensation, the verified benefit, the verified additional payment, the minimum wage information, the threshold salary, the location and the recruitment policy. In this regard, the present invention encompasses that the acceptance feedback module [110] iteratively requests a second salary proposal from the at least one candidate device [102] until at least one of a response from an HR module [116] and a positive response from the at least one candidate device [102] is received at the acceptance feedback module [110].

Yet another aspect of the present invention relates to a non-transitory computer-readable medium comprising instructions for causing a computer to perform the method of determining a selection of at least one candidate device, wherein the at least one candidate device is associated with a human resource (candidate); receiving a compensation data from the at least one candidate device; creating a first salary proposal based on the compensation data; transmitting the first salary proposal to the at least one candidate device; receiving a response from the at least one candidate device for the first salary proposal; generating a salary offer for the at least one candidate device based on the response received for the first salary proposal; and transmitting the salary offer to the at least one candidate device for assessing and negotiating compensation of the human resource (candidate) associated with the at least one candidate device.

Figure 3:
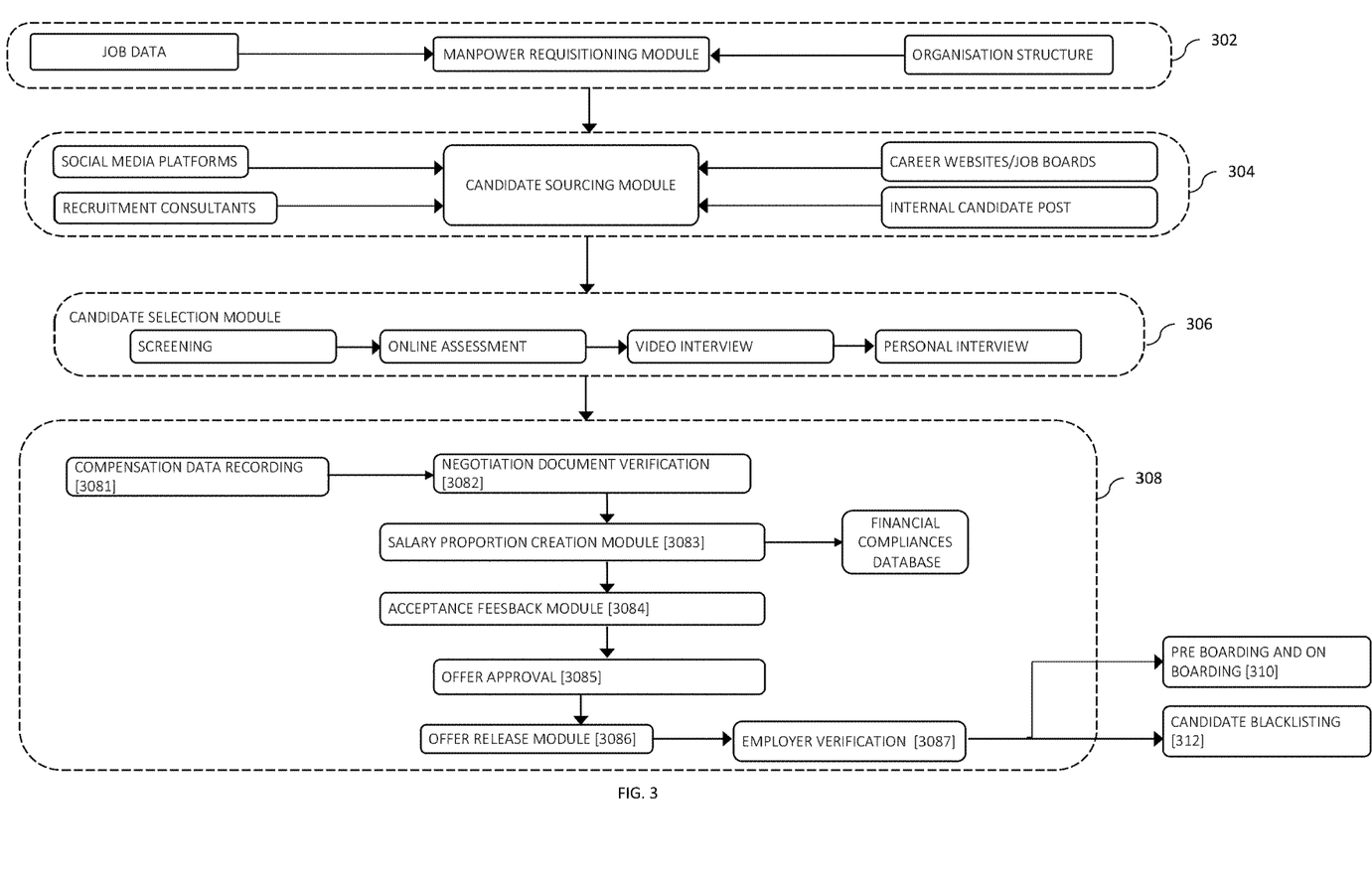
Referring to FIG. 3 illustrates an exemplary high-level signal flow in the compensation assessment and negotiation system, in accordance with the exemplary embodiments of the present invention.

Referring to FIG. 3 illustrates an exemplary high-level signal flow in the compensation assessment and negotiation system, in accordance with the exemplary embodiments of the present invention. At step [302], the manpower requisitioning module collects the data which includes job descriptions, pay-bands, skills required along with the details of organization structure which includes vacancies, positions, and employee requirement and determines the number of candidates required to be hired. At step [304], the candidate sourcing module [120] collects information from various sources which includes social media platforms, career consultants, career websites/job boards, and internal candidate pool along with the required input from the manpower requisitioning module.

At step [306], at the candidate selection module [104], the candidates are selected using a series of tests and interviews for a job including but not limited to online assessments, video interviews or personal interviews thereby, helping in the selection of the candidate. Thereafter, the compensation data recording module [106] is triggered and it captures the component-wise compensation details of the candidate using the at least one candidate device [102] at step [3081]. This process helps in identification/mapping of the key components of salary currently being drawn by the candidate, which further aids in removing the compensation interpretation bias of recruiters, hence providing uniform negotiation experience across large and distributed organization.

At step [3081], the compensation data recording module [106] also enables the selected candidates to upload compensation documents in the system. This sets the data and document accountability with the candidate. At step [3082], the verification module [114] verifies the compensation details against the compensation documents uploaded, wherein the details are matched against the pay band for each job role and the compensation being drawn by the current employees of such role within the organization, thus improving data reliability and governance.

At step [3083], the salary proposal creation module [108] recommends the salary proposals that can be offered to the candidate based on the analysis of following parameters which includes but not limited to component-wise verified compensation details, a total compensation approach (which further includes compensation, valuation of benefits, location amongst other factors), a median of the salary range, a statutory minimum wages of the respective location. The salary proposal creation module [108] further divides the entire proposal into various sections (including but not limited to fixed compensation, variable compensation, benefits, additional payments, grade) enabling recruiter to do section-wise negotiation with the candidate. The system also highlights the personalized unique selling points in various sections for each candidate profile.

At step [3084], the acceptance feedback module [110] receives a response from the at least one candidate device [102] for the first salary proposal. Once the total compensation value is agreed by both candidate and recruiter, the offer release module [112] initiates the approval process at step [3085]. In case a recruiter has multiple candidates, the candidate selection module [104] shows detailed comparison of candidates and recommends the most suitable candidate to submit for offer approval. Thereafter, the formal offer is release to the candidate at step [3086]. Subsequently, at step [3087], the verification module [114] performs verification of the candidates' information. The system also has a special provision for regulating negotiation with ex-employees as per company policy. The system also allows candidates to design/tweak own package by selecting various salary components keeping the approved total compensation value intact post the approval of the offer. The system also records individual candidate's experiences during negotiation after completion.

Further, in case, the proposal is not acceptable to the candidate, then following options are open to the candidate which are as follows, firstly, the candidate can request for revision in offer proposal and can also propose a compensation. Once candidate makes a counter-proposal, system also shows the probability of the proposal being accepted by the recruiter on a real-time basis. This keeps the candidate expectations realistic and the process transparent. Secondly, based on the inputs, the next suitable proposal is prepared by SCANS which is again shared with candidate by the recruiter, wherein the said process is iterated till the candidate accepts the offer or candidate is rejected by the recruiter.

At step [310], consequently, at the time of pre-boarding or on-boarding, the pre-boarding and on-boarding module [122] the transfers the approved compensation value (including benefits) to the HR module [116]. This ensures that the commitments made to the candidate during negotiation are honoured, wherein the acceptance of salary draft and all communications during the negotiation process is controlled by the system, thus, minimizing any miscommunication. Also, in event upon performing verification of the candidates information, logs and historical data the system determines inconsistencies (e.g. forged documents, etc.), the candidate blacklisting module [124] blacklists candidates who are not coherent with the whole recruitment process at step [312]. The system also learns feedbacks received and the successful/unsuccessful proposals to increase the frequency of success for first proposal.

Figure 4:
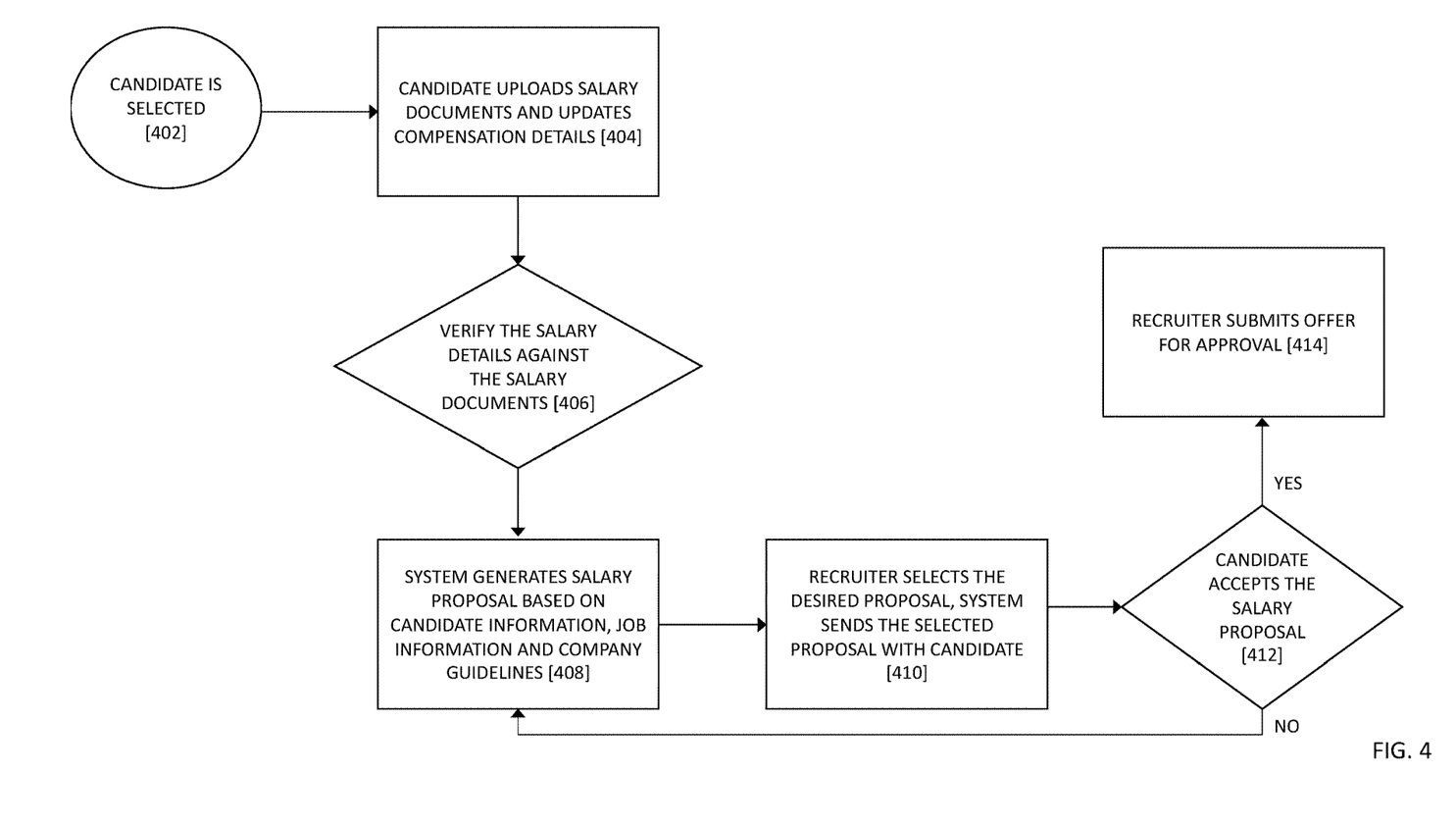
Referring to FIG. 4 illustrates a verification process flow, in accordance with the exemplary embodiments of the present invention.

Referring to FIG. 4 illustrates a verification process flow, in accordance with the exemplary embodiments of the present invention. Described below is the working steps for document verification process flow for individual candidates in the end-to-end compensation assessment and negotiation system architecture with reference to FIG. 4 above. At step [402] after at least one candidate has been selected, the at least one candidate provides the compensation details using their candidate device [102] and uploads the compensation documents (compensation data) from the previous organizations where they are working or might have worked previously at step [404]. At step [406], the verification module [114] verifies the previous compensation details submitted by the at least one candidate with the compensation documents received from the at least one candidate. The present invention encompasses that more than one proposal are generated by the salary creation module and the recruiter can select one of the proposals to the at least one candidate at step [408]. Further, a selected proposal (or offer) is sent to the at least one candidate for consideration at step [410].

At step [412], the offer made by the recruiter if accepted by the candidate is forwarded to the higher-level executive authorities for further approval. The further steps include after the release of the offer and its acceptance, the medical and document verification is completed and is sent to the HR head. However, at step [412], after the recruiter submits the offer to approval the agent and recruiter verify the documents where two cases arise, firstly, if the documents submitted possess some anomalies, then the offer is deemed to be withdrawn or sent to the candidate for re-submission with additional details. Secondly, if the documents submitted by the candidate are correct, then post verification it is sent for further approvals. At step [414], if the agent approves the documents submitted by the candidate the on-boarding process is initiated and the candidate details are sent for further approval.

Figure 5:
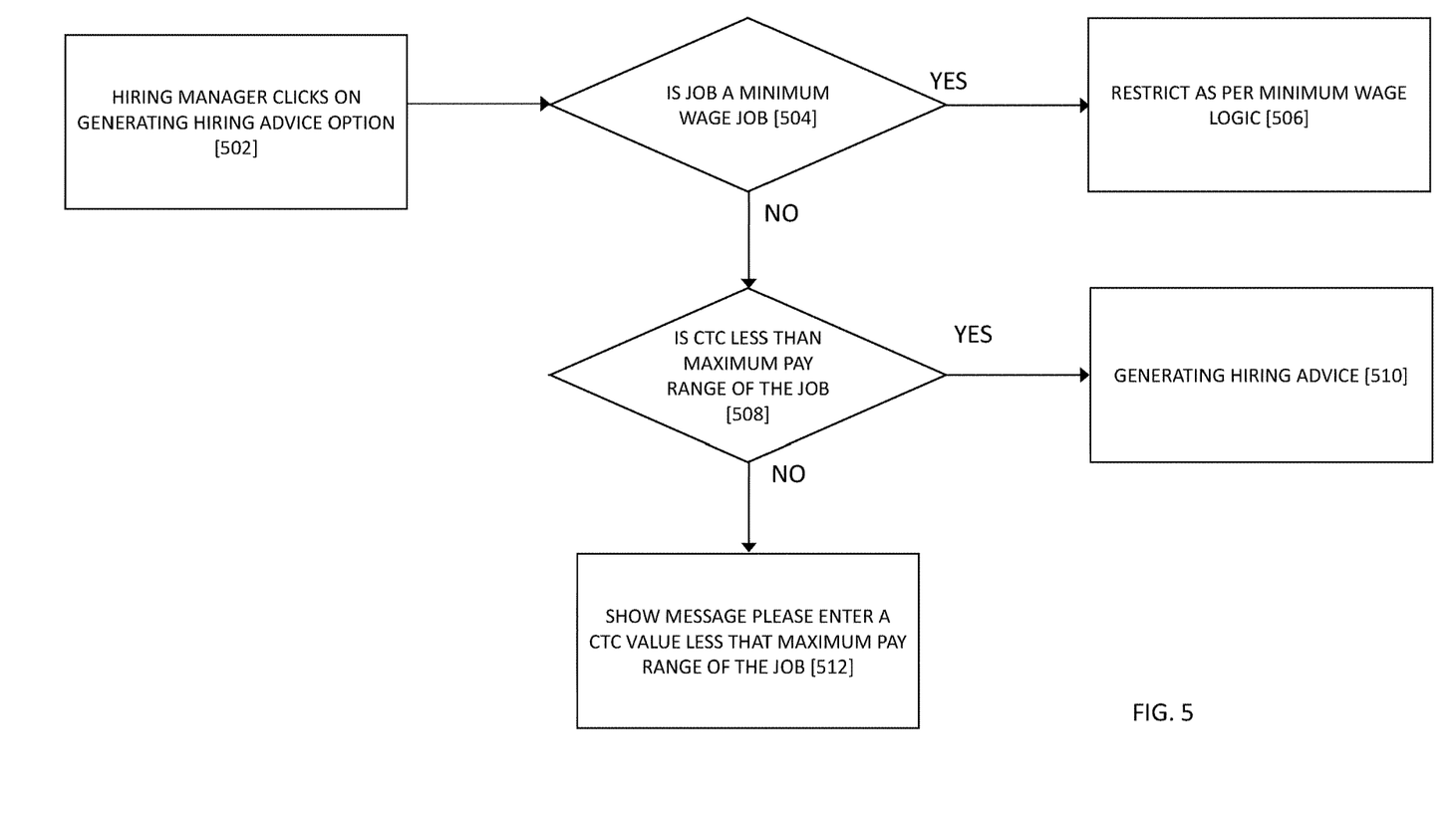
Referring to FIG. 5 illustrates a logic flow diagram for determining the minimum wage, in accordance with the exemplary embodiments of the present invention.

Referring to FIG. 5 illustrates a logic flow diagram for determining the minimum wage, in accordance with the exemplary embodiments of the present invention. Described below is the working steps for high-level compensation and minimum wage check logic flow diagram for individual candidates which is depicted in the end-to-end compensation assessment and negotiation system architecture with reference to FIG. 5. At step [502], for checking and verifying the minimum wages, the recruiter clicks on the 'generate compensation', wherein the job profile is checked whether it falls under the category listed in the minimum wage job. At step [504], the system checks if the job is listed under minimum wage category based on a minimum wage database comprising details of minimum wages associated with different job descriptions in different locations. Then the generated compensation is restricted as per minimum wage logic at step [506]. At step [508], in case, the job is not listed in the said category, a further check is performed in which the CTC and pay range on the job are matched for generating a compensation at step [510] based on salary proposal compensation module [108]. In the case, when the CTC offered is less than the maximum pay range offered on the job, then a logic is triggered to generate a revised compensation at step [512].

Figure 6:
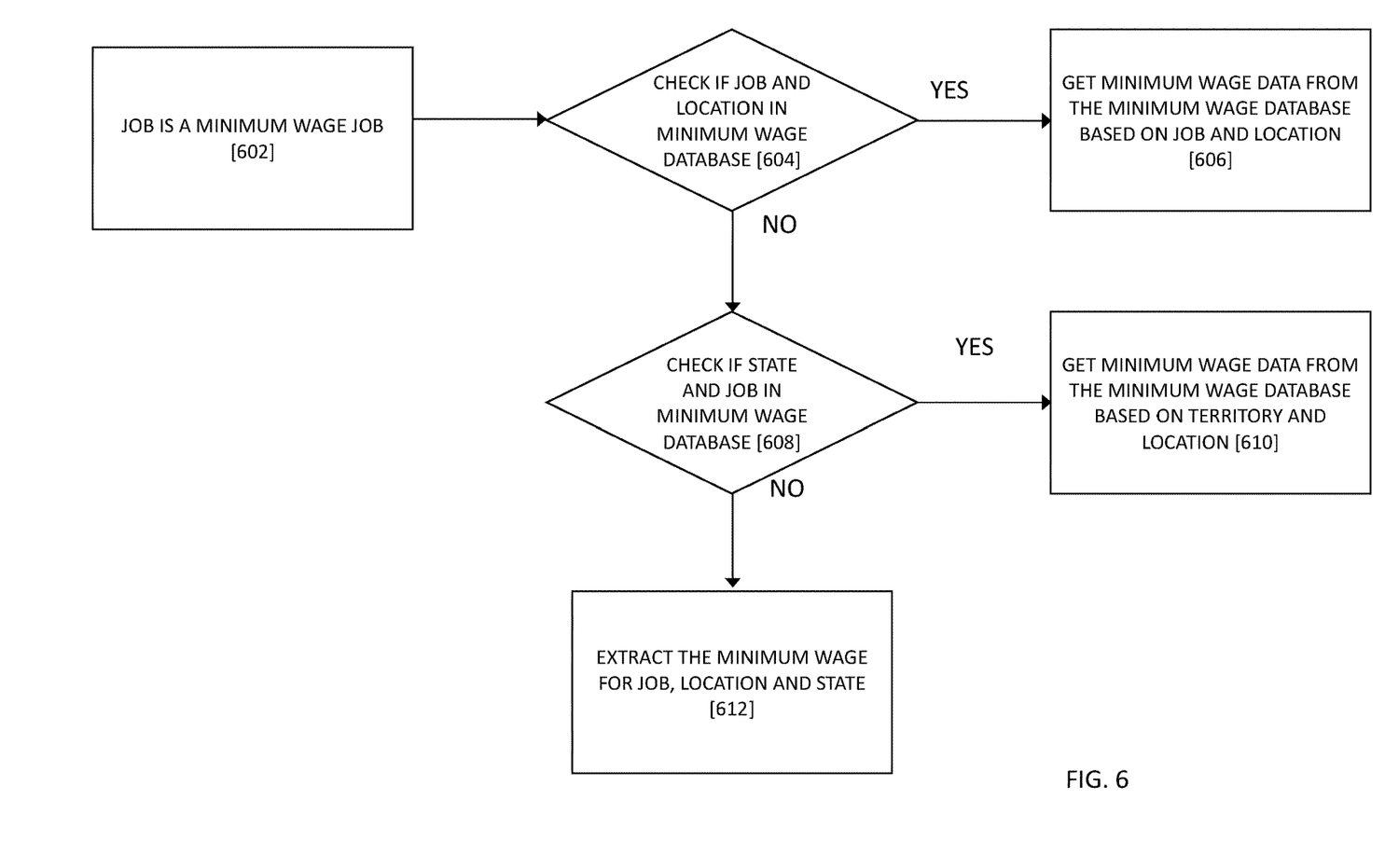
Referring to FIG. 6 illustrates a logic flow diagram for determining territory based minimum wage, in accordance with the exemplary embodiments of the present invention.

Referring to FIG. 6 illustrates a logic flow diagram for determining territory based minimum wage, in accordance with the exemplary embodiments of the present invention. Described below is the working steps for high-level territory based minimum wage check logic flow diagram for individual candidates which is depicted in the end-to-end compensation assessment and negotiation system architecture with reference to FIG. 6. At step [602], for checking and verifying the minimum wages in a particular location, wherein the job profile is checked whether it falls under the category listed in the minimum wage job, a recruiting manager can select the option "JOB IS A MINIMUM WAGE". At step [604], if the system determines that the job is a minimum wage job, then the minimum wage in the wages database for the job and the location are provided on display. In other instances, at step [608], the job is checked in a state-wise category if it is listed as a minimum wage job, wherein the minimum wage in the wages database for the job and state are provided is extracted at step [610]. At step [612], if the job is not listed in the minimum wage job, then the max CTC (cost-to-company compensation) is governed as per the median salary for the job.

Thus, the present invention provides a novel solution for efficiently providing an automated human resource assessment and negotiation solution to offer component-wise verified compensation details to a candidate based on including but not limited to total compensation approach (which includes compensation, valuation of benefits, location and many other factors), median of the salary range, statutory minimum wages, location, etc. wherein the proposed solution also helps in selecting the individuals having characteristics that correspond to a profile. It also provides an efficient solution for the prospective candidates based on the analysis of varied sections including but not limited to fixed compensation, variable compensation, benefits, additional payments, grade thereby, enabling candidates and recruiters to perform section-wise negotiation with the candidate. The solution of the present invention also provides an effective salary negotiation during the recruitment process by saving cost for various large scale and distributed organizations who lose millions every year due to structural inefficiencies of salary negotiation and aids in bringing standardization in the recruitment process leading to uniformity, fairness and speed. It also solves the problem of ensuring adherence to the minimum wage regulation across the large scale & distributed organization.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for assessing and negotiating compensation of a human resource, the method comprising:
    selecting, by one or more processors, at least one candidate device associated with a human resource;
    receiving, by the one or more processors, a compensation data from the at least one candidate device;
    creating, by the one or more processors, a first salary proposal based on the received compensation data;
    transmitting, by the one or more processors, the first salary proposal to the at least one candidate device;
    receiving, by the one or more processors, a response from the at least one candidate device for the first salary proposal;
    generating, by the one or more processors, a salary offer for the at least one candidate device based on the response received for the first salary proposal, wherein the salary offer is stored in a candidate database; and
    transmitting, by the one or more processors, the salary offer to the at least one candidate device for assessing and negotiating compensation of the human resource associated with the at least one candidate device;
    requesting, by the one or more processors, at least one subsequent second salary proposal from the at least one candidate device based on the response received for the first salary proposal;
    continuously training, by the one or more processors, a data model based on the response received for the first salary proposal, wherein the trained data model determines an acceptance rate of the at least one subsequent second salary proposal received from the at least one candidate device;
    displaying, by the one or more processors, in real time, the acceptance rate of the at least one subsequent second salary proposal at the at least one candidate device; and
    transmitting, by the one or more processors, a request for at least one of: an identity data, an educational data, and a medical data to the at least one candidate device;
    receiving, by the one or more processors, at least one of: the identity data, the educational data, and the medical data from the at least one candidate device;
    verifying, by the one or more processors, at least one of: the identity data, the educational data, and the medical data received from the at least one candidate device; and
    storing, by the one or more processors, the salary offer and the verified at least one of: the identity data, the educational data, and the medical data for the at least one candidate device.

2. The method as claimed in claim 1, wherein selecting, by the one or more processors, the at least one candidate device is based on at least one of: an assessment score, a video interview score, and a personal interview score.

3. The method as claimed in claim 2, wherein selecting, by the one or more processors, the at least one candidate device in an event there are two or more candidate devices having at least one of: the assessment score, the video interview score, and the personal interview score same further comprises:
    comparing at least one of: the assessment score, the video interview score, and the personal interview score of the two or more candidate devices;
    transmitting a rating for the two or more candidate devices to a user based on the comparison; and
    receiving, from the user, the selection of the at least one candidate device from the two or more candidate devices.

4. The method as claimed in claim 1, wherein receiving, by the one or more processors, the compensation data from the at least one candidate device further comprises requesting the at least one candidate device for first data.

5. The method as claimed in claim 1, wherein the first salary proposal comprises one or more sections including at least one of: a fixed compensation, a variable compensation, a benefit, and an additional payment, and wherein the method further comprises highlighting, by the one or more processors, personalized parameters in the one or more sections for the human resource associated with the at least one candidate device.

6. The method as claimed in claim 1, wherein the creating, by the one or more processors, the first salary proposal further comprises:
    receiving at least one of: an assessment score, a video interview score, and a personal interview score for the at least one candidate device;
    receiving at least one of: a verified fixed compensation, a verified variable compensation, a verified benefit, and a verified additional payment;
    extracting at least one of: a minimum wage information, a threshold salary, a location, and a recruitment policy; and
    creating the first salary proposal for the at least one candidate device based on at least one of:
    the assessment score, the video interview score, the personal interview score, the verified fixed compensation, the verified variable compensation, the verified benefit, the verified additional payment, the minimum wage information, the threshold salary, the location, and the recruitment policy.

7. The method as claimed in claim 6, wherein the method comprises requesting, by the one or more processors, the at least one subsequent second salary proposal from the at least one candidate device based on a negative response received for the first salary proposal, and wherein the method further comprises:
    receiving, by the one or more processors, the at least one subsequent second salary proposal from the at least one candidate device; and
    creating, by the one or more processors, a third salary proposal based on at least one of: the at least one subsequent second salary proposal, the assessment score, the video interview score, the personal interview score, the verified fixed compensation, the verified variable compensation, the verified benefit, the verified additional payment, the minimum wage information, the threshold salary, the location, and the recruitment policy.

8. The method as claimed in claim 7, further comprising iteratively requesting, by the one or more processors, the at least one subsequent second salary proposal from the at least one candidate device until a positive response is received from the at least one candidate device.

9. The method as claimed in claim 1, wherein generating, by the one or more processors, the salary offer for the at least one candidate device is based on a positive response received for the first salary proposal.

10. The method as claimed in claim 1, wherein the generating, by the one or more processors, the salary offer for the at least one candidate device further comprises receiving at least one of: a fixed compensation input, a variable compensation input, a benefit input, and an additional payment input from the at least one candidate device, and wherein the salary offer is generated based on the received at least one of: the fixed compensation input, the variable compensation input, the benefit input, and the additional payment input.

11. A compensation assessment and negotiation system, comprising:
   one or more processors; and
   memory coupled to the one or more processors, the memory storing instructions, which, when executed on the one or more processors, cause the one or more processors to:
      select at least one candidate device associated with a human resource;
      receive a compensation data from the at least one candidate device;
      create a first salary proposal based on the compensation data;
      transmit the first salary proposal to the at least one candidate device;
      receive a response from the at least one candidate device for the first salary proposal;
      generate a salary offer for the at least one candidate device based on the response received for the first salary proposal, wherein the salary offer is stored in a candidate data base;
      transmit the salary offer to the at least one candidate device for assessing and negotiating compensation of the human resource associated with the at least one candidate device;
      request at least one subsequent second salary proposal from the at least one candidate device based on the response received for the first salary proposal;
      continuously train a data model based on the response received for the first salary proposal, wherein the trained data model determines an acceptance rate of the at least one subsequent second salary proposal received from the at least one candidate device;
   display, in real time, the acceptance rate of the at least one subsequent second salary proposal at the at least one candidate device; and
   transmitting, by the one or more processors, a request for at least one of: an identity data, an educational data, and a medical data to the at least one candidate device;
   receiving, by the one or more processors, at least one of: the identity data, the educational data, and the medical data from the at least one candidate device;
   verifying, by the one or more processors, at least one of: the identity data, the educational data, and the medical data received from the at least one candidate device; and
      storing, by the one or more processors, the salary offer and the verified at least one of: the identity data, the educational data, and the medical data for the at least one candidate device.

12. A non-transitory computer-readable medium comprising instructions for causing a computer comprising one or more processors to perform a method comprising:
   selecting at least one candidate device, wherein the at least one candidate device is associated with a human resource;
   receiving a compensation data from the at least one candidate device;
   creating a first salary proposal based on the compensation data;
   transmitting the first salary proposal to the at least one candidate device;
   receiving a response from the at least one candidate device for the first salary proposal;
   generating a salary offer for the at least one candidate device based on the response received for the first salary proposal, wherein the salary offer is stored in a candidate database;
   transmitting the salary offer to the at least one candidate device for assessing and negotiating compensation of the human resource associated with the at least one candidate device;
   requesting at least one subsequent second salary proposal from the at least one candidate device based on the response received for the first salary proposal;
   continuously training a data model based on the response received for the first salary proposal, wherein the trained data model determines an acceptance rate of the at least one subsequent second salary proposal received from the at least one candidate device;
   upon the receipt of the at least one subsequent second salary proposal from the at least one candidate device, displaying, in real time, the acceptance rate of the at least one subsequent second salary proposal at the at least one candidate device; and
   transmitting, by the one or more processors, a request for at least one of: an identity data, an educational data, and a medical data to the at least one candidate device;
   receiving, by the one or more processors, at least one of: the identity data, the educational data, and the medical data from the at least one candidate device;
   verifying, by the one or more processors, at least one of: the identity data, the educational data, and the medical data received from the at least one candidate device; and
   storing, by the one or more processors, the salary offer and the verified at least one of: the identity data, the educational data, and the medical data for the at least one candidate device.

* * * * *